J. DYER.
SAWING AND MITERING MACHINE.
APPLICATION FILED JAN. 21, 1909.
963,697.
Patented July 5, 1910.
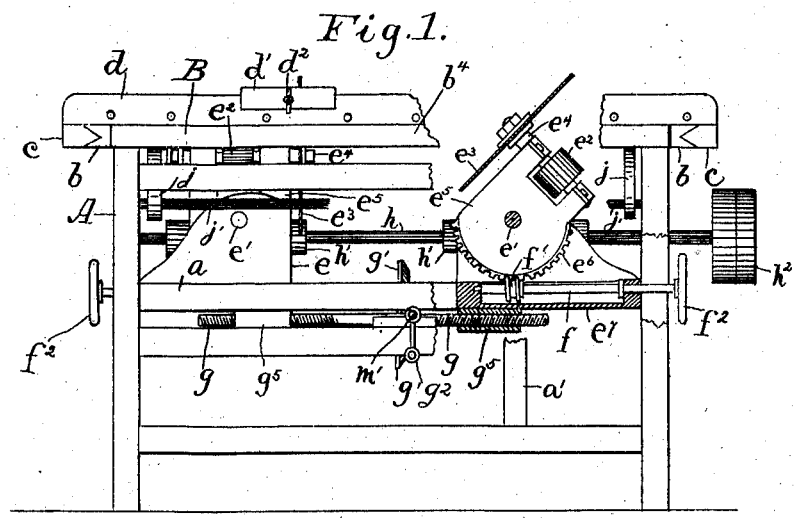
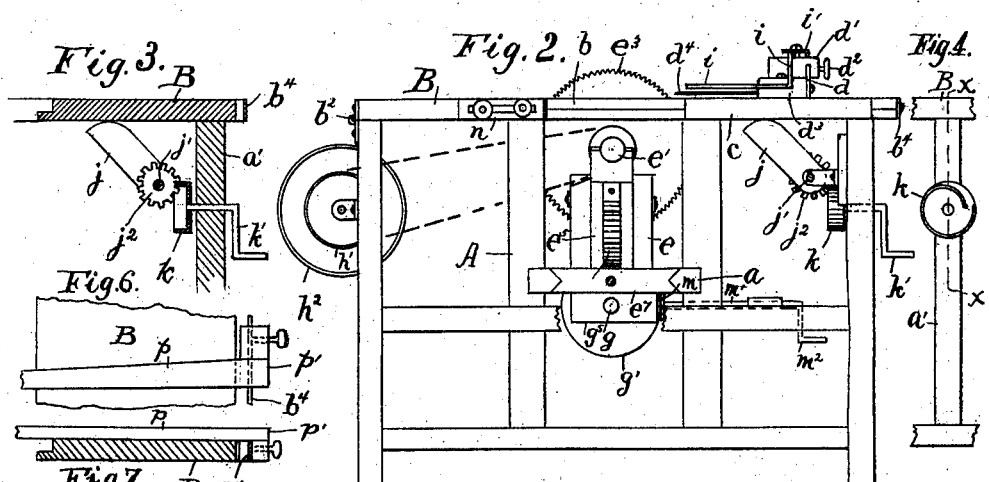
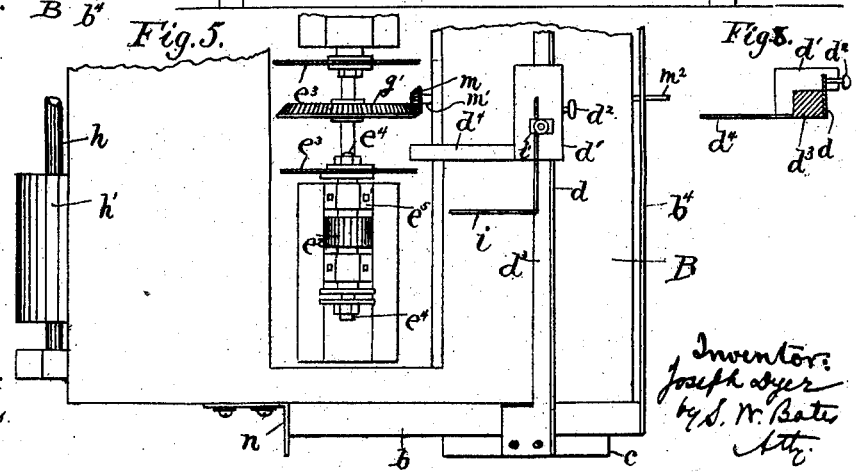
Witnesses:
E. S. Colley
E. W. Dennis
Inventor:
Joseph Dyer
by S. W. Bates
Atty.

UNITED STATES PATENT OFFICE.

JOSEPH DYER, OF FAIRFIELD, MAINE.

SAWING AND MITERING MACHINE.

963,697.

Specification of Letters Patent. Patented July 5, 1910.

Application filed January 21, 1909. Serial No. 473,538.

*To all whom it may concern:*

Be it known that I, JOSEPH DYER, of Fairfield, in the county of Somerset, State of Maine, have invented certain new and useful Improvements in Sawing and Mitering Machines, of which the following is a specification.

My invention relates to a combined sawing and mitering machine such as are used in the manufacture of window screens and the like from wood and the object of the invention is to construct a machine of this character which may be used for a great variety of work and which may be quickly and easily adjusted.

The invention consists of the combination and arrangement of parts as hereinafter set forth and claimed.

I illustrate my invention by means of the accompanying drawing in which—

Figure 1 is a front elevation of the machine with parts shown in section, Fig. 2 is a side view of same, Fig. 3 is a section on $x$ $x$ of Fig. 4. Fig. 4 is a detail elevation showing cam for raising the table, Fig. 5 is a partial plan. Fig. 6 is a plan and section, showing a gage for plan work. Fig. 7 is a detail section showing the means for supporting the work, and Fig. 8 is an elevation of the part shown in Fig. 6 with the table shown in section.

In the drawing, A represents a suitable frame on the top of which is hinged a table B by means of hinges $b^2$. The forward end of the table is raised and lowered by means of two arms $j$ secured to the ends of a horizontal shaft $j'$ journaled near the front of the frame. The arms $j$ impinge against the under side of the table being normally in an inclined position and as the shaft $j'$ is turned the table is raised or lowered. The rotation of the shaft is accomplished by means of a cam $k$ having an inwardly projecting flange which engages the teeth of a gear $j^2$ located on the shaft $j'$. The cam is operated by means of a crank $k'$ and as the flange turns it turns the gear at the rate of one tooth to each revolution of the cam.

The saws are here shown as two in number and each is mounted on a carriage $e$ carried by a base $e^7$ which slides on V-shaped guides $a$ extending transversely across the machine beneath the table. The carriages are moved from and toward each other by means of a right and left handed screw $g$ which engages a nut $g^5$ on the under side of each carriage. The screw $g$ is provided with a bevel gear $g'$ which engages a bevel pinion $m$ this latter being on a countershaft $m'$ turned by a crank $m^2$. Thus by turning the crank $m^2$ the two saw carriages may be made to come together or separate. Each of the carriages $e$ has an abutment on each side and between the two abutments is pivoted by means of a pivot $e'$ the tilting saw support $e^5$ provided on its lower edge with a segmental gear $e^6$ and on the upper portion with suitable boxes in which are journaled the saw arbor $e^4$ with a pulley $e^2$ and saw $e^3$.

The two saws are normally mounted on the ends of the arbors nearest each other but for special work one of the arbors is made double so that the saw may be mounted on either end. As shown the saw arbor on the left of Fig. 1 has a double arbor the purpose of which will be hereinafter explained. The segmental saw support is tilted by means of a worm $f'$ engaging the gear teeth of the segmental gear, the worm being on a shaft $f$ mounted in the base $e^7$ of the carriage and it is provided with an operating handle $f^2$. The saws are rotated by means of elongated pulleys $h'$ located on a driving shaft $h$ journaled at the rear of the machine and driven by the driving pulley $h^2$.

Means are provided by holding and guiding the work which consists largely of strips of wood to be mitered or cut off square. For cutting off wood strips, I provide a work support consisting of a support bar $d^3$ extending transversely across the table from one edge to the other and above the upper surface. Each end of the bar is connected to a slide $c$ held in V-shaped grooves formed in the guides $b$ secured to the edges of the table, and the support bar may thus be pushed toward the saws and drawn back by hand. For the purpose of supporting the two ends of the wood strips while running them on the saw, I provide a work holding bracket which may be attached to the support bar at any desired point. For this purpose I secure to the front edge of the bar $d^3$ an upward projecting flange here shown as a metal strip $d$ secured to the bar by screws. The bracket $d'$ is formed so as to embrace the flange $d$ and is adjustably secured thereto by a set screw $d^2$. The rear portion of the bracket extends back of and substantially down to the bottom of the bar $d^3$ and it has a work supporting arm $d^4$ which extends back and just above the level of the table. Two of these brackets are secured to the flange $d$ and they are so adapted as to support the ends of the pieces to be sawed. A suitable gage $i$ is secured to the bracket $d'$ by means of a clamp $i'$ and this gage serves as a guide for the ends of the pieces. To keep the support bar $d^3$ from running onto the saws, I provide a stop $n$ which is attached to the edge of the table and in which is a slot for the purpose of adjustment to different sized saws.

My machine is capable of doing a great variety of work. When one end of the strip is to be squared and one end mitered the saws are arranged as in Fig. 1, the distance apart of the saws being regulated by turning the crank $g^2$. If both ends are to be mitered with oppositely inclined cuts the saws are both tilted back in the same manner as the tilted saw in Fig. 1. When the opposite ends of the strip are to be mitered with parallel cuts the saw at the left is shifted to the other end of the arbor and the saw support inclined so as to bring the saws parallel and at the same height. Tonguing and grooving can also be done by means of the double arbor without change. This operation is only possible when a double arbor is used. When the saws are to be used for stripping, the support bar $d^3$ is removed and a gage such as is shown in Fig. 6 is used.

In addition to the common forms of ripping done by other machines are the following. By using the two saws two strips of different widths can be sawed at one movement, one edge straight and the other beveled, or both edges beveled at any angle at one movement of the feeding device. When the saws are in a normal or upright position, the arbors are so arranged with relation to the counter shaft that when the saws are tilted the twist in the belt is sufficient to keep it at the same tension in any position. The gage is composed of a body portion $p$ which embraces the guide bar $b^4$ secured to the front edge of the table and separated therefrom by a space the gage being secured in place by a set screw.

The machine is thus adapted to do any form of cutting off, mitering and stripping, the adjustments are all quickly and easily made, the machine may be cheaply constructed, and it is well adapted for many kinds of wood working shops.

I claim:—

1. In a sawing machine the combination of a frame, a table thereon, a work support slidably mounted on said table and composed of a transverse bar, an upright flange on said bar and extending longitudinally thereof and a work holding bracket embracing said flange and having projecting arms extending rearward and above the table and clamping means for clamping the bracket to the flange.

2. In a sawing and mitering machine, the combination of a table having a horizontal V-shaped groove in each of its lateral edges, guides adapted to slide in said grooves, a bar connecting said guides and extending above the upper surface of the table, an upright flange on said bar extending above said bar and longitudinally thereof, a work holding bracket having a longitudinal slot adapted to embrace said flange and having horizontal arms projecting rearward and above and separated from the table and clamping devices for clamping the bracket in place.

3. In a sawing and mitering machine, the combination of a table having a horizontal V-shaped groove in each of its lateral edges, guides adapted to slide in said grooves, a bar connecting said guides and extending above the upper surface of the table, an upright flange on said bar extending above said bar and longitudinally thereof, a work holding bracket having a longitudinal slot adapted to embrace said flange and having horizontal arms projecting rearward and above and separated from the table, a clamping device for clamping the bracket in place and an end gage adjustably secured to the said bracket.

In testimony whereof I have affixed my signature this 12 day of January, 1909.

JOSEPH DYER.

Witnesses:
W. W. MANFORD,
H. H. FISH.